United States Patent
Yukiura et al.

(10) Patent No.: US 8,582,143 B2
(45) Date of Patent: Nov. 12, 2013

(54) IMAGE READING APPARATUS AND CONTROL METHOD

(75) Inventors: Shinichi Yukiura, Yokohama (JP); Kuniaki Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 998 days.

(21) Appl. No.: 12/187,379

(22) Filed: Aug. 7, 2008

(65) Prior Publication Data

US 2009/0040560 A1 Feb. 12, 2009

(30) Foreign Application Priority Data

Aug. 10, 2007 (JP) ................................ 2007-208737

(51) Int. Cl.
- G06F 3/00 (2006.01)
- G06F 3/14 (2006.01)
- G06K 15/00 (2006.01)
- H04N 1/00 (2006.01)
- H04N 1/047 (2006.01)
- H04N 1/04 (2006.01)

(52) U.S. Cl.
USPC ........ 358/1.15; 358/1.16; 358/1.17; 358/505; 358/474; 358/496; 358/497; 358/498

(58) Field of Classification Search
USPC .............. 358/1.15, 1.16, 1.17, 505, 474, 496, 358/497
See application file for complete search history.

(56) References Cited

U.S. PATENT DOCUMENTS

| | | | |
|---|---|---|---|
| 4,598,323 A * | 7/1986 | Honjo et al. | 358/449 |
| 4,962,430 A * | 10/1990 | Hiroki et al. | 358/296 |
| 5,239,387 A * | 8/1993 | Stein et al. | 358/444 |
| 5,444,555 A * | 8/1995 | Ono | 358/494 |
| 5,465,172 A * | 11/1995 | Fukushima et al. | 358/498 |
| 5,654,804 A * | 8/1997 | Hattori | 358/404 |
| 5,825,512 A * | 10/1998 | Okita | 358/496 |
| 5,901,278 A * | 5/1999 | Kurihara et al. | 358/1.15 |
| 6,648,226 B2 | 11/2003 | Haba | |
| 7,995,234 B2 * | 8/2011 | Bokelman et al. | 358/1.16 |
| 2002/0080420 A1 * | 6/2002 | Yokochi | 358/471 |
| 2005/0078333 A1 * | 4/2005 | Kobako et al. | 358/1.15 |

FOREIGN PATENT DOCUMENTS

| | | | |
|---|---|---|---|
| JP | 07-212534 | * | 8/1995 |
| JP | H08-056283 A | | 2/1996 |
| JP | 11-41431 | * | 2/1999 |
| JP | 11-239251 | | 8/1999 |
| JP | 2000-287045 | | 10/2000 |
| JP | 2003-283777 | * | 10/2003 |
| JP | 2008-92233 | * | 4/2008 |
| JP | 2008-092233 | * | 4/2008 |

* cited by examiner

*Primary Examiner* — King Poon
*Assistant Examiner* — Beniyam Menberu
(74) *Attorney, Agent, or Firm* — Canon U.S.A., Inc. IP Division

(57) ABSTRACT

An image reading apparatus comprising a conveying unit configured to convey a document; a reading unit configured to read an image of the document conveyed by the conveying unit; a storage unit configured to store data of the image read by the reading unit; a transfer unit configured to transfer the data stored in the storage unit to an external unit during a reading operation of the reading unit; and a reading control unit configured to control the reading unit to perform or stop the reading operation according to a threshold value related to a free space available for storing the data in the storage unit.

8 Claims, 8 Drawing Sheets

IMAGE READING APPARATUS AND CONTROL METHOD

BACKGROUND OF THE INVENTION

1. Field of the Invention

The present invention relates to an image reading apparatus configured to read a document and a control method thereof.

2. Related Background Art

While data has been conventionally stored in paper, data can be readily computerized and stored at low cost in recent years, since personal computers (PCs) are commonly used and highly functionalized.

Some scanners (image reading apparatuses) are equipped with an automatic document feeder (ADF) to readily obtain an electronic file at high speed without manually feeding individual documents. The reading speed of the ADF is one of significant specifications for users, along with image quality.

When the document reading speed of the ADF exceeds a speed of transferring image data to a host computer, the read image data is temporarily stored in a storage unit (hereinafter referred to as a buffer memory) of the scanner to be subsequently transferred.

When the buffer memory has become full, image reading is temporarily suspended until the buffer memory becomes empty. When the buffer memory has become empty, image reading is resumed.

Interrupting read processing of a document as described above is, hereinafter, referred to as start/stop processing (SS processing). When SS processing is performed, document transfer for reading is suspended. Therefore, the occurrence of SS processing results in an increased amount of time required for reading a document.

However, along with a tendency toward higher resolution in recent years, the amount of data to be transferred may become enormous. Therefore, SS processing tends to occur more frequently. The frequency of occurrence of SS processing depends on a data transfer capacity to a host computer.

The data transfer capacity depends on various configuration elements, such as the type/speed of a central processing unit (CPU), a memory size, the capacity/speed of a hard disk drive (HDD), and the transfer speed for each communication method.

Further, the image reading apparatus may include a copying function, such as in a copying machine, in addition to the function of a personal computer (PC) scan for transferring image data read by an image scanner to a host computer.

Furthermore, even when a document is read using the ADF provided in a device (peripheral device or peripheral apparatus) having a facsimile (FAX) sending function, SS processing may also occur.

When SS processing occurs, an image continuity may be lost to deteriorate image quality. However, as long as the document is stably conveyed in a document conveyance path, the deterioration of image quality caused by SS processing can be reduced to some extent.

There can be some points in the document conveyance path that cause a document to move unstably. In this case, when SS processing is performed at such a point, image data read before stopping and image data read after resuming may not be smoothly joined, so that image quality may be greatly deteriorated.

In order to prevent image data from being deteriorated by the occurrence of SS processing, U.S. Pat. No. 6,648,226 discusses a method of changing the reading speed of an image reading apparatus according to a transfer time from an image reading apparatus to a host computer. When a long time is required to transfer image data to the host computer, the amount of stored image data in a buffer random access memory (RAM) is reduced by decreasing the reading speed, thus reducing the frequency of occurrence of SS processing.

Japanese Patent Application Laid-Open No. 11-239251 discusses a method of temporarily stopping reading when the free space of a buffer memory in a reading apparatus is a certain value or less. Further, Japanese Patent Application Laid-Open No. 11-239251 discusses a method of determining whether the image type is a white image or a black image during reading.

Japanese Patent Application Laid-Open No. 2000-287045 discusses that, if reading is interrupted, a switchback operation is performed depending on the position of a reading sensor unit when reading is resumed after interruption.

The occurrence of SS processing occurrence cannot be prevented according to the above-described methods, which can only reduce the frequency of occurrence of SS processing by decreasing the reading speed. SS processing may occur when data processing is seriously delayed in a host computer or when the transfer speed of a data transfer unit decreases for some reasons.

In this case, at some positions where a document stops in a document conveyance path of the reading apparatus, the document is neither smoothly conveyed nor smoothly read when reading is resumed, so that the quality of image data may be deteriorated.

SUMMARY OF THE INVENTION

The present invention is directed to an image reading apparatus and a control method thereof that is capable of reducing the deterioration of image quality by setting a condition for performing SS processing such that SS processing does not occur when a document is unstable in behavior.

According to an aspect of the present invention, an image reading apparatus includes a conveying unit configured to convey a document; a reading unit configured to read an image of the document conveyed by the conveying unit; a storage unit configured to store data of the image read by the reading unit; a transfer unit configured to transfer the data stored in the storage unit to an external unit during a reading operation of the reading unit; and a reading control unit configured to control the reading unit to perform or stop the reading operation according to a threshold value related to a free space available for storing the data in the storage unit.

According to another aspect of the present invention, a method is provided for controlling an image reading apparatus including a conveying unit configured to convey a document, a reading unit configured to read an image of the document conveyed by the conveying unit, and a storage unit configured to store data of the image read by the reading unit, the method comprising reading the document with the reading unit; transferring the data stored in the storage unit to an external unit during a reading operation by the reading unit; determining whether to stop the reading operation based on a threshold value related to a free space available for storing the data in the storage unit; and changing the threshold value based on a position of the document conveyed by the conveying unit.

According to exemplary embodiments of the present invention, a reading operation on a document is performed such that reading is not interrupted when the document is unstable in behavior. Thus, the deterioration of the read image can be reduced.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

First Exemplary Embodiment

Figure 1:
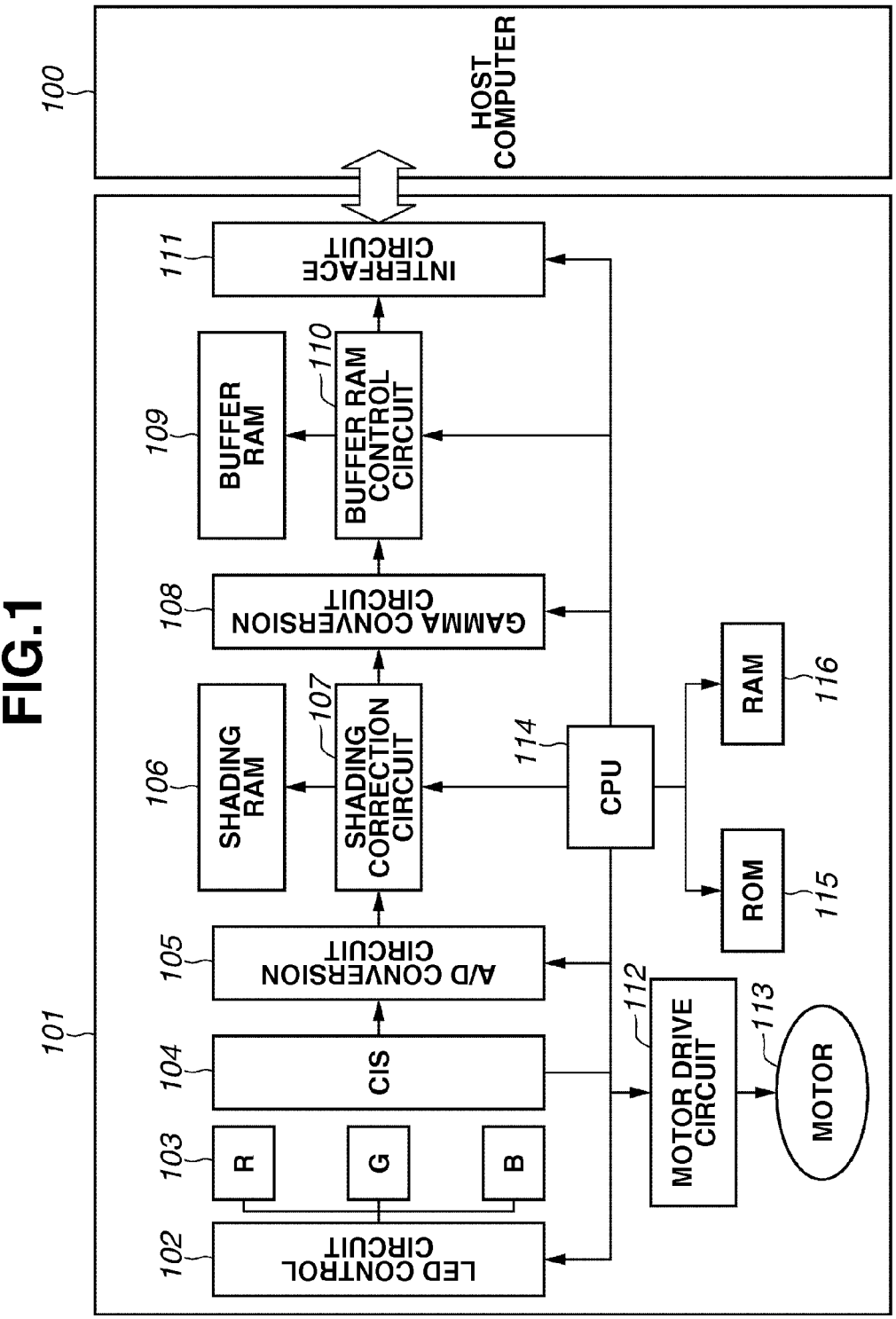
FIG. 1 illustrates an example configuration of an image reading apparatus according to an exemplary embodiment of the present invention.

FIG. 1 illustrates an example configuration of an image reading apparatus according to an exemplary embodiment of the present invention. The image reading apparatus 101 is connected to a host computer (host apparatus) 100 and reads an image upon receiving a reading performing instruction from the host computer 100. Image data read by the image reading apparatus 101 is transferred to an external device (host computer 100) via an interface circuit 111. The host computer 100 displays or stores the transferred data.

The image reading apparatus 101 includes a contact image sensor (hereinafter referred to as a "CIS") 104 and a light emitting diode (LED) 103, which is a light source.

The image reading apparatus 101 further includes an LED control circuit 102, an analog-to-digital (A/D) conversion circuit 105, a shading RAM 106, and a shading correction circuit 107. The image reading apparatus 101 further includes a gamma conversion circuit 108, a buffer RAM 109, a buffer RAM control circuit 110, a motor drive circuit 112, a motor 113, a central processing unit (CPU) 114, a read-only memory (ROM) 115, and a RAM 116.

The CPU 114 controls an operation of the image reading apparatus 101 according to a program stored in the ROM 115. The ROM 115 also stores a threshold value, which will be described below.

The threshold value relates to a free space in a data storage unit that temporarily stores read image data. More specifically, the threshold value is a value [byte] related to a free space [byte] in the buffer RAM 109.

Upon receiving a scanning instruction from the host computer 100 via the interface circuit 111, the image reading apparatus 101 starts the LED control circuit 102 and the CIS 104 to read a document. The CPU 114 controls the image reading apparatus 101.

The A/D conversion circuit 105 converts document information obtained by the CIS 104 into a digital signal and transfers the digital signal to the shading correction circuit 107. The shading correction circuit 107 performs shading correction processing on the digital signal based on shading data stored in the shading RAM 106.

The gamma conversion circuit 108 gamma-converts corrected data, which is then transferred to the buffer RAM control circuit 110. The buffer RAM control circuit 110 stores the gamma-converted data in the buffer RAM 109. The buffer RAM control circuit 110 transfers, to the interface circuit 111, data read from the buffer RAM 109.

The interface circuit 111 transfers the data to the host computer 100. With the configuration described above, image data is transferred to the host computer 100 in the order of reading performed by the CIS 104. More specifically, while storing, in the buffer RAM 109, data transferred from the gamma conversion circuit 108, the buffer RAM control circuit 110 transfers data to the host computer 100 via the interface circuit 111.

The buffer RAM control circuit 110 controls data storage into the buffer RAM 109 and the order of transferring data from the buffer RAM 109. The buffer RAM 109 stores data in the order of lines read by the CIS 104 and transfers data in the order of reading.

The buffer RAM control circuit 110 reads information about positions of the stored data in the buffer RAM 109 and the transferred data in the buffer RAM 109 to detect a free space in the buffer RAM 109.

The buffer RAM 109 stores data read by the CIS 104 before the data is transferred to the host computer 100. The CPU 114 determines a free space [byte] available for storing, in the buffer RAM 109, the read data on which the shading correction and gamma correction have been performed.

The CPU 114 acquires information about the free space (remaining amount) in the buffer RAM 109 each time the CIS 104 reads one line of an image. That is, the CPU 114 acquires information about the free space (remaining amount) in the buffer RAM 109 in units of one line.

Then, the CPU 114 determines whether to perform SS processing based on the information on the free space (remaining amount) in the buffer RAM 109 and a threshold value, which will be described below.

Figure 2:
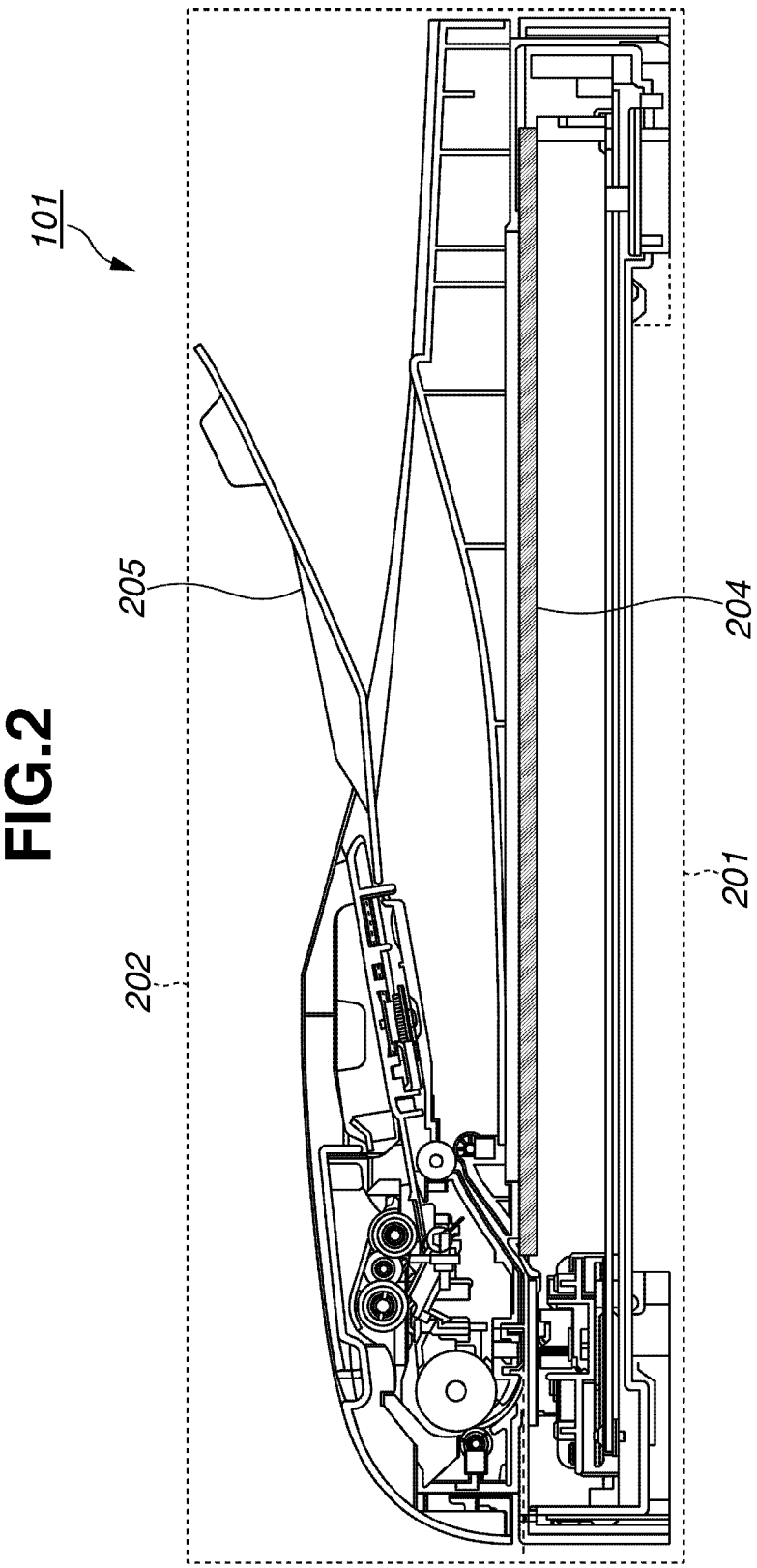
FIG. 2 is a vertical sectional view of the image reading apparatus according to an exemplary embodiment of the present invention.

FIG. 2 is a vertical sectional view of the image reading apparatus 101, illustrating a main-body scanner unit 201 and an ADF unit 202. The ADF unit 202 is connected to the end portion of the main-body scanner unit 201 and can be opened and closed. When the ADF unit 202 is opened, a document can be placed on a document plate 204, so that flatbed scanning can be performed. A document tray 205 is used to directly convey a document to the ADF 202.

Figure 3:
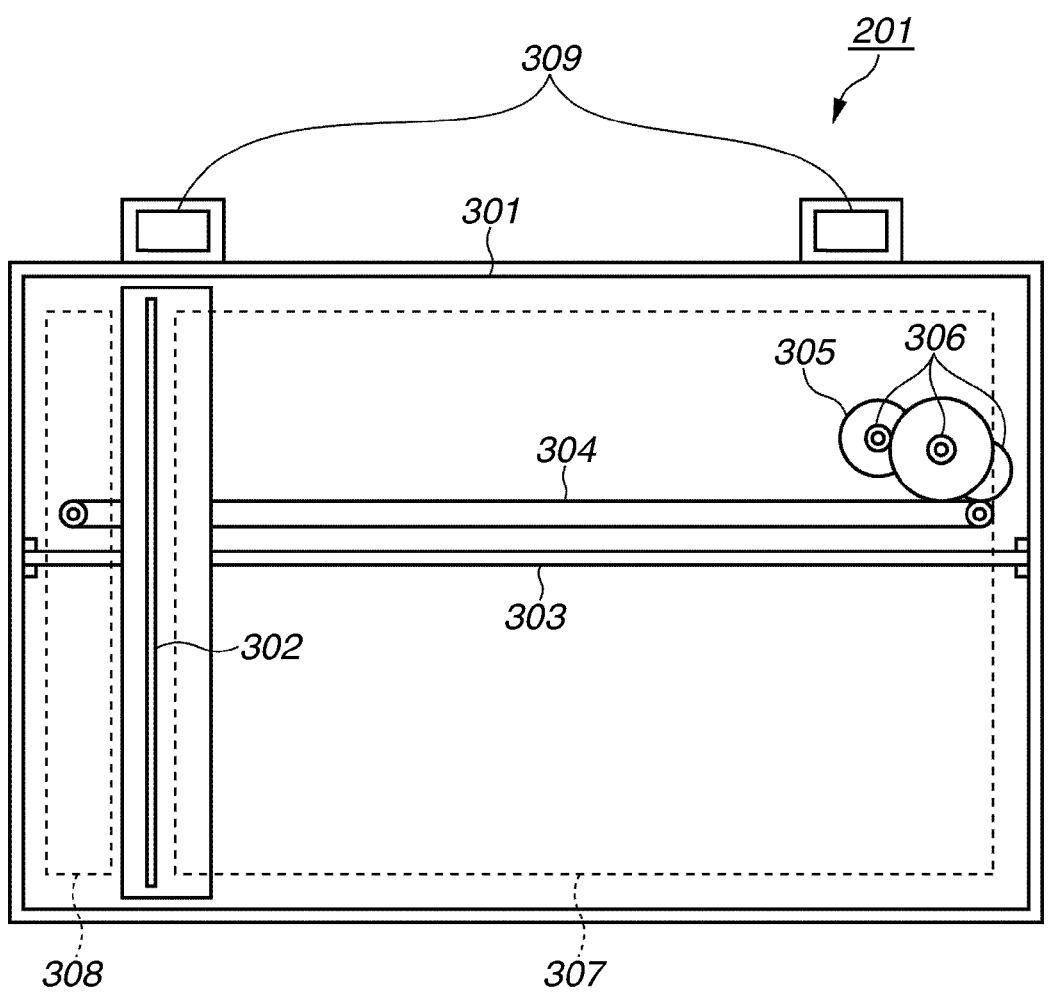
FIG. 3 is a cross sectional view of a main-body scanner unit according to an exemplary embodiment of the present invention.

FIG. 3 is a cross sectional view of the main-body scanner unit 201. The main-body scanner unit 201 includes a frame member 301 and a sensor unit 302. The sensor unit 302 moves along a reference axis 303 when moving in the sub-scanning direction. An operation belt 304 drives the sensor unit 302 along the reference axis 303.

The main-body scanner unit 201 further includes a flatbed (FB) stepping motor 305, a group of gears 306 that convey a driving force from the FB stepping motor 305 to the operation belt 304. A document can be placed on a document glass plate 307 for flatbed scanning.

An ADF reading window 308 is used for ADF scanning and made of a material that transmits light from the LED 103 like the document glass plate 307. The main-body scanner unit 201 is connected to the ADF unit 202 at a connection portion 303.

Upon receiving a flatbed scanning instruction from the host computer 100, the image reading apparatus 101 drives the FB stepping motor 305 to drive the operation belt 304 via the group of gears 306. Thus, the sensor unit 302 moves along the reference axis 303 in the sub-scanning direction to read a document on the document plate 307.

Figure 4:
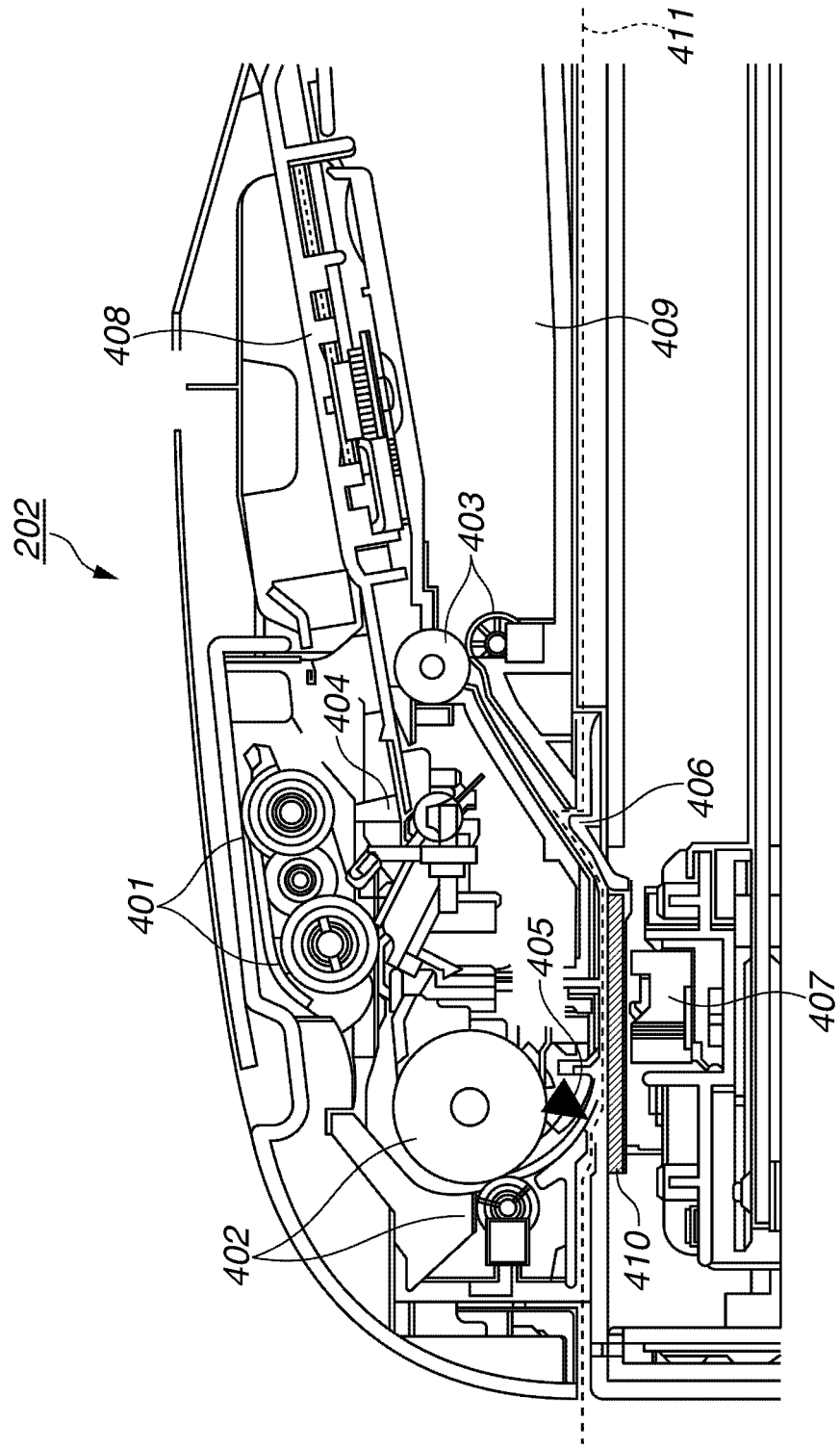
FIG. 4 is a vertical sectional view of an ADF unit according to an exemplary embodiment of the present invention.

FIG. 4 is a vertical sectional view of the ADF unit 202. The ADF unit 202 conveys a document to be read with three rollers, a pickup roller 401, a conveyance roller 402, and a discharge roller 403. The pickup roller 401 conveys a document placed on a document tray 408, which can stack documents to be read, into a document conveyance path in the ADF unit 202.

The conveyance roller 402 conveys the document conveyed into the document conveyance path by the pickup roller 401, and the discharge roller 403 conveys the document conveyed by the conveyance roller 402 to a discharge tray 409. A document glass plate 410 is used for ADF scanning. A CIS 407, which is fixedly positioned, reads the document on the document glass plate 410 from below.

A document sensor 404 detects whether a document is on the document tray 408. A document edge sensor (hereinafter, referred to as a "DES") 405 detects the position of the leading edge of a document conveyed into the document conveyance path. A jump platform 406 helps the document pass through a boundary between the main-body scanner unit 201 and the ADF unit 202.

Dotted line 411 illustrates the boundary between the main-body scanner unit 201 and the ADF unit 202. A portion located above the dotted line 411 cam be opened and closed.

Figure 5:
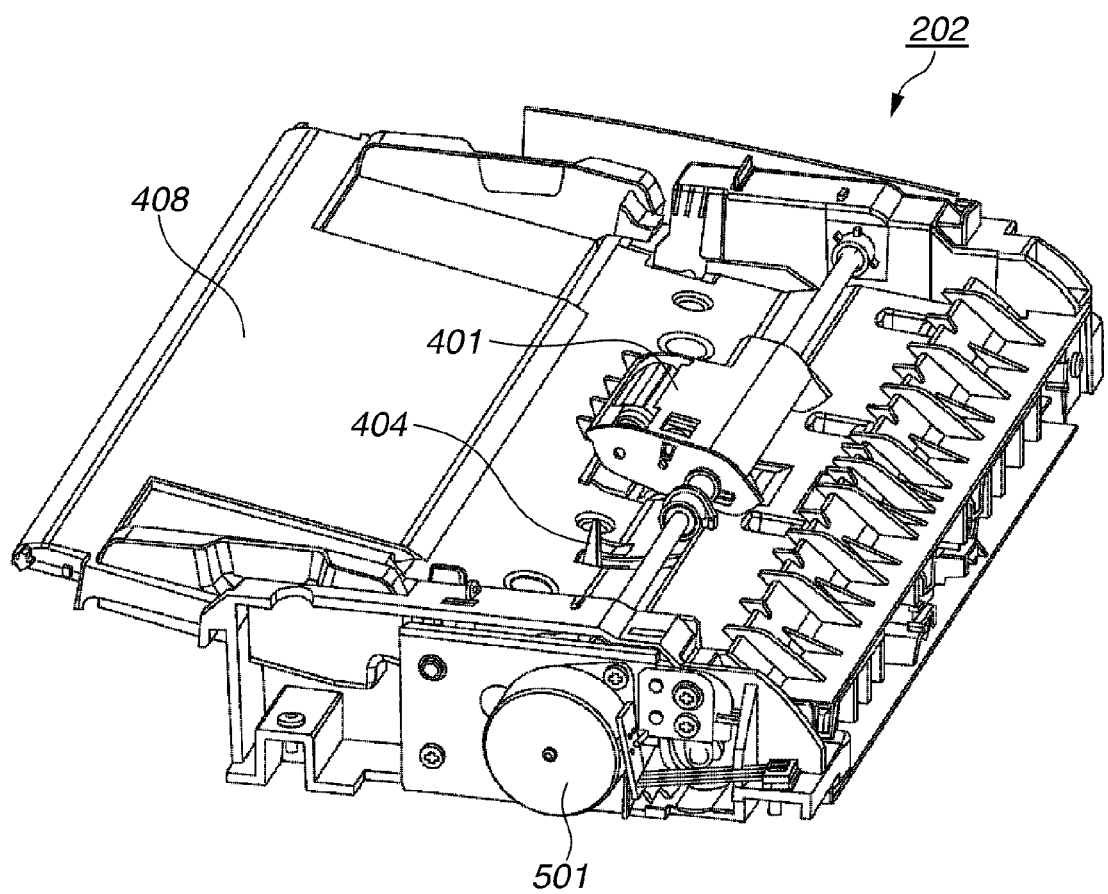
FIG. 5 is a perspective view of the ADF unit according to an exemplary embodiment of the present invention.

FIG. 5 is a perspective view of the ADF unit 202. An ADF stepping motor 501 drives three motors, the pickup roller 401, conveyance roller 402, and discharge roller 403.

Upon receiving an ADF scanning instruction from the host computer 100, the image reading apparatus 101 detects whether a document is on the document tray 408 using the document sensor 404. When detecting a document on the document tray 408, the image reading apparatus 101 drives the ADF stepping motor 501 to cause the sensor unit 302 to move to below the ADF reading window 308.

After the sensor unit 302 is moved, the host computer 100 controls the ADF stepping motor 501 to start driving the pickup roller 401. One of documents stacked on the document tray 408 is separated by the pickup roller 401 and conveyed into the document conveyance path. The document conveyed into the document conveyance path is conveyed to the conveyance roller 402, the DES 405, the CIS 407, and the discharge roller 403 in this order.

A reading control operation for a single sheet of document is described now. In a case where reading starts with the leading edge of a document, when the leading edge of the document reaches the CIS 407, the CIS 407 starts reading. The CPU 114 determines timing when the leading edge of the document reaches the CIS 407 based on timing information from the DES 405, which detects the leading edge of a document, and the number of pulses applied to the ADF stepping motor 501, which is driven after the detected timing.

Then, by counting the number of pulses applied to the ADF stepping motor 501, the CPU 114 determines the position of the CIS 407 on the document in the conveyance direction. Additionally, the CIS 407 is configured to read one line of the document in synchronization with a pulse output for driving the ADF stepping motor 501.

A distance from the DES 405 to the CIS 407 is a unique value determined by a mechanical configuration. If the distance is denoted as D1, when the document is conveyed the distance D1 after the leading edge of the document has passed the DES 405, the leading edge of the document reaches the CIS 407.

Accordingly, in a case where the CIS 407 starts reading a document at a position a distance D2 away from the leading edge of the document, the CIS 407 starts reading the document when the document has been conveyed the distance D1 plus the distance D2 after the leading edge of the document has passed the DES 405. Even after CIS 407 starts reading the document, the CPU 114 continues managing the position of the document in the document conveyance path based on the leading edge position of the document detected by the DES 405 and a driving amount of the ADF stepping motor 501.

For example, in a case where the CIS 407 reads a document up to the trailing edge thereof, the CIS 407 ends reading the document when the document has been conveyed the distance D1 after the DES 405 has detected the trailing edge of the document. Further, in a case where the CIS 407 reads a document up to a distance D3 before the trailing edge of the document (towards the leading edge of the document), the CIS 407 ends reading when the document has been conveyed a distance "D1-D3" after the trailing edge of the document has passed the DES 405.

After the CIS 407 ends reading, the document is discharged to the discharge tray 409 by the discharge roller 403. As described above, the CIS 407 reads a document sheet by sheet. The buffer RAM 109 stores image data read by the CIS 407. The image data stored (accumulated) in the buffer RAM 109 is transferred to the host computer 100 via the interface circuit 111. When the speed of reading by the CIS 407 is higher than the speed of transferring to the host computer 100, image data is stored in the buffer RAM 109.

At this point, when the buffer RAM 109 has already stored previously-read image data, subsequently-read image data is overwritten on the previously-read image data. Therefore, the previously-read image data may be changed before being transferred to the host computer 100.

In order to prevent such overwriting, SS processing for stopping reading is performed. A region where read data is not yet stored (a region where, even if any data is stored, further data can be stored without overwriting) in the capacity of the buffer RAM 109 is referred to as a "free space". When the buffer RAM 109 has a free space, overwriting is not performed.

There are two points where image quality may be deteriorated when SS processing is performed in the document conveyance path in the image reading apparatus 101. One of them is a region where the leading edge of a document reaches the jump platform 406, and the other is a region where the leading edge of a document reaches the discharge roller 403.

In a state where the document is being conveyed, when the leading edge of the document passes the jump platform 406, the document passes over the boundary between the main-body scanner unit 201 and the ADF unit 202. Further, when the leading edge of the document is located near the jump platform 406, the curvature of the document in the conveyance direction becomes great. Therefore, the document curves along the document conveyance path, so that the document may become unstable in behavior.

Further, when the leading edge of the document reaches the discharge roller 403 to be caught thereby, the document also tends to become unstable. As a result of unstable conveyance of the document, image data read from the document by the CIS 407 is different from image data that otherwise should be read.

This is because, the distance (positional relationship) between the document and the CIS 407 when stopping reading may be different from that when resuming reading. Consequently, a joint line between the image data when stopping reading and the image data when resuming reading becomes highly visible, so that image quality may be deteriorated.

If SS processing is performed in any of the two regions described above, image quality can be more deteriorated than when SS processing is performed in other regions.

Hereinafter, the region where image quality may be deteriorated if SS processing is performed is referred to as an "SS-forbidden region (document unstable region)", and other regions where the document is stably conveyed are referred to as a "document stable region".

In order to prevent an image from being deteriorated by SS processing performed when a document is unstable, the following control operation is performed.

Figure 6:
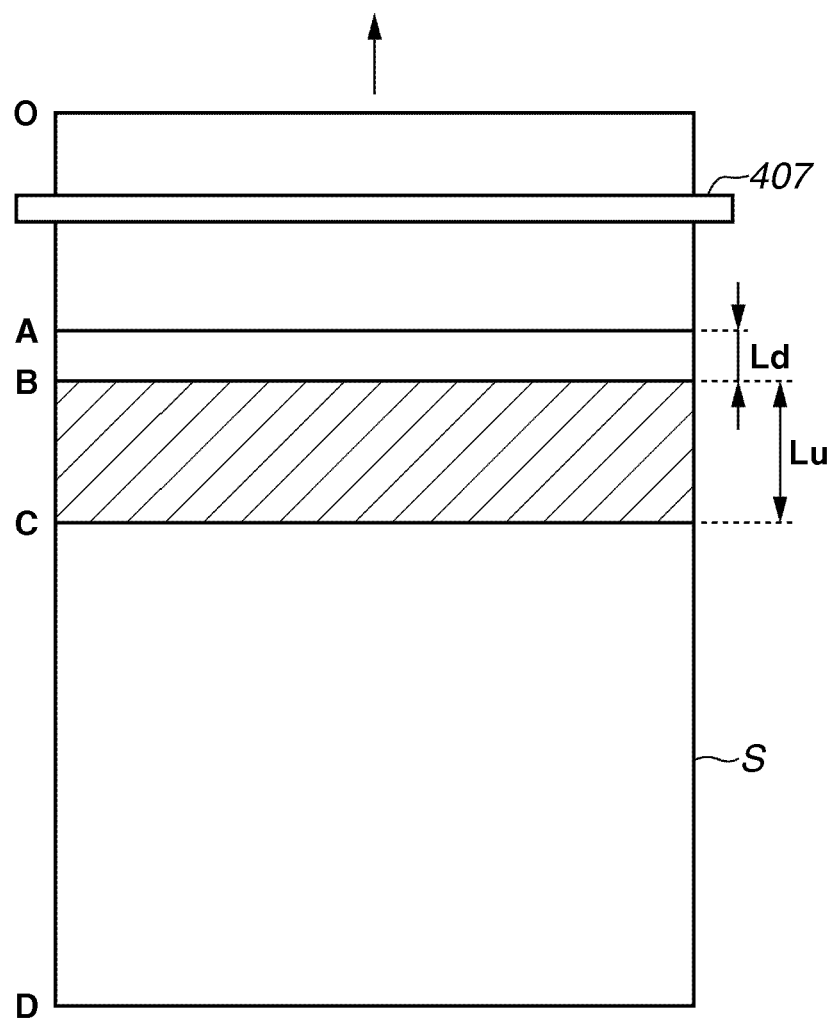
FIG. 6 illustrates a positional relationship between a reading region of a document and the position of a contact image sensor according to a first exemplary embodiment of the present invention.

FIG. 6 illustrates a relationship between a reading region of a document S and the position of the CIS 407, in which there is one SS-forbidden region (document unstable region).

While the CIS 407 is fixed, the document S moves in the direction of an arrow illustrated in FIG. 6. The document S includes a leading edge O. When the leading edge O of the document S is located at the position of the jump platform 406 illustrated in FIG. 4, the CIS 407 is located at a position between positions B and C.

A region between the positions B and C (hatched portion) is the SS-forbidden region (document unstable region) When the CIS 407 reads the hatched portion of the document S, image quality can be deteriorated if SS processing is performed.

On the other hand, a region between positions O and B and a region between positions C and D are document stable regions, where image quality is not deteriorated even if SS processing is performed while the CIS 407 reads these regions. FIG. 6 illustrates a state where the CIS 407 is reading a region between positions O and A.

Methods for determining SS processing by the CPU 114 will be described as follows.

1. Determining SS Processing During Read Processing Between Positions O and A (Except for the Position A)

When the CIS 407 is reading the document S between the positions O and A (except for the position A), the CPU 114 determines whether a free space [byte] in the buffer RAM 109 is smaller than a threshold value S1. The threshold value S1 described herein satisfies the following conditional expression. More specifically, the threshold value S1 [byte] is a value related to a free space [byte] in the buffer RAM 109 and is stored in the ROM 115 illustrated in FIG. 1.

$$S1 = Bl \times Ld$$

In the above-mentioned equation, Bl is a data size [byte] required for reading one line, and Ld is the number of lines required from starting to decrease the reading speed to stoppage of the document. That is, Ld is the number of lines that are read in a decreasing-speed control region. As the reading speed becomes higher, the distance required until the document is stopped becomes longer, that is, the value Ld becomes larger. Conversely, as the reading speed becomes lower, the distance required until the document is stopped becomes shorter, that is, the value Ld becomes smaller.

In other words, the threshold value S1 is obtained by multiplying the number of lines Ld required from starting to decrease the reading speed to stoppage of the document by the data size Bl [byte] required for reading one line.

When the CIS 407 is reading the document between the positions O and A (except for the position A), the CPU 114 determines whether the free space in the buffer RAM 109 is larger than the threshold value S1. If the CPU 114 determines that the free space in the buffer RAM 109 is not larger than the threshold value S1, the CPU 114 performs SS processing. In other words, the CPU 114 decreases the document conveying speed to stop the document. Then, the CPU 114 waits while stopping reading the document until the buffer RAM 109 becomes empty as image data stored in the buffer RAM 109 is transferred.

Since SS processing is performed when the CIS 407 is located between the positions O and A and the buffer RAM 109 is made empty, the CIS 407 can be prevented from stopping between positions B and C. When the buffer RAM 109 has become empty, the CIS 407 resumes conveying the document and the CIS 407 resumes reading the document.

If the CPU 114 determines that the free size in the buffer RAM 109 is larger than the threshold value S1 when the CIS 407 is reading the document between the positions O and A, the processing proceeds to the next step (continuing reading)

2. Determining SS Processing During Reading Processing at the Position A

When the CIS 407 is reading a line corresponding to the position A, the CPU 114 determines whether the free space in the buffer RAM 109 is smaller than a threshold value S2. The threshold value S2 satisfies the following conditional expression.

Here, the position A represents a position Ld lines before the hatched region where the document is unstably conveyed (a position Ld lines before the SS-forbidden region). Ld is the number of lines required from starting to decrease the reading speed to stoppage of the document. Lu is the number of lines required for reading between the positions B and C, which is determined by a mechanical configuration.

$$S2 = Bl \times (Ld + Lu)$$

The CPU 114 determines whether the free space in the buffer RAM 109 is larger than the threshold value S2 at the position A. If the CPU 114 determines that the free space in the buffer RAM 109 is not larger than the threshold value S2 at the position A, the CPU 114 performs SS processing. In this case, the CIS 407 stops reading just before the position B (at a position where the SS-forbidden region starts). After SS processing is performed, when the buffer RAM 109 has become empty, reading is resumed. When the buffer RAM 109 is empty, the buffer RAM 109 has the maximal free space.

When the CIS 407 is reading a line corresponding to the position A, if the CPU 114 determines that the free space in the buffer RAM 109 is larger than the threshold value S2, the processing proceeds to the next step.

When the CIS 407 is reading the position A, if the free space in the buffer RAM 109 is the threshold value S2 or larger, the CIS 407 does not stop reading between the positions B and C, since the buffer RAM 109 secures S2 or more bytes of the free space. That is, the threshold value S2 is obtained by adding the number of lines required for reading the SS-forbidden region to the number of lines Ld required from starting to decrease the reading speed to stoppage of the document and then by multiplying the added value by the data size Bl [byte] required for reading one line.

3. Determining SS Processing During Reading Processing Between the Positions A and D (Except for the Position A)

When the CIS 407 is reading the document between the positions A and D (except for the position A), the CPU 114 determines whether the free space in the buffer RAM 109 is larger than the threshold value S1. If the CPU 114 determines that the free space in the buffer RAM 109 is not larger than the threshold value S1, the CPU 114 performs SS processing.

However, actually, the relationship between threshold value S2 and the free space in the buffer RAM 109 is determined at the position A. Therefore, the buffer RAM 109 secures a free space larger than the threshold value S2 at the position A. Alternatively, when the free space is not larger than the threshold value S2, SS processing for stopping the document just before the position B is performed.

3-(1). A Case where the Free Space is not Larger than the Threshold Value S2 at the Position A.

The document is stopped just before the position B where the document is conveyed the distance Ld away from the position A. Since all of the data in the buffer RAM 109 is transferred at this point, the buffer RAM 109 has the maximal free space therein at the position B.

SS processing is determined using the threshold value S1 after the position B. Since the free space is maximal at the position B, the free space is larger than the threshold value S1 between the positions B and C. Therefore, the CIS 407 does not stop reading between the positions B and C. Consequently, the document is not stopped in the SS-forbidden region. SS processing is determined using the threshold value S1 between the positions C and D.

3-(2). A Case where the Free Space is Larger than the Threshold value S2 at the position A.

According to the determination result at the position A, the buffer RAM 109 has a free space larger than the threshold value S2=Bl×(Ld+Lu). In this state, SS processing is determined using the threshold value S1 after the CIS 407 passes the position A. At the point when the buffer RAM 109 stores data of Bl×Lu [byte] since the CIS 407 has passed the position A, the buffer RAM 109 has a remaining space of Bl×Ld, which is just the threshold value S1 [byte].

In other words, when the document is read between the positions B and C, SS processing is not performed (reading is not stopped) from the position C to a position the distance Ld before the position C, since the buffer RAM 109 has a free space larger than the threshold value S1.

The position the distance Ld before the position C is supposed to be a position X. When the buffer RAM 109 is determined to have a free space not larger than the threshold value S1 at the position X, SS processing is performed. Since the distance Ld is required for stopping the document, reading is stopped at the position C. When the buffer RAM 109 is determined to have a free space larger than the threshold value S1 at the position X, reading is continued.

Summing up the above description, when the buffer RAM 109 has a free space larger than the threshold value S2 at the position A, consequently, the CPU 114 does not stop reading between the positions A and C (except for the position A), and, thus, does not stop the document in the SS-forbidden region. SS processing is determined using the threshold value S1 between the positions C and D.

Figure 8:
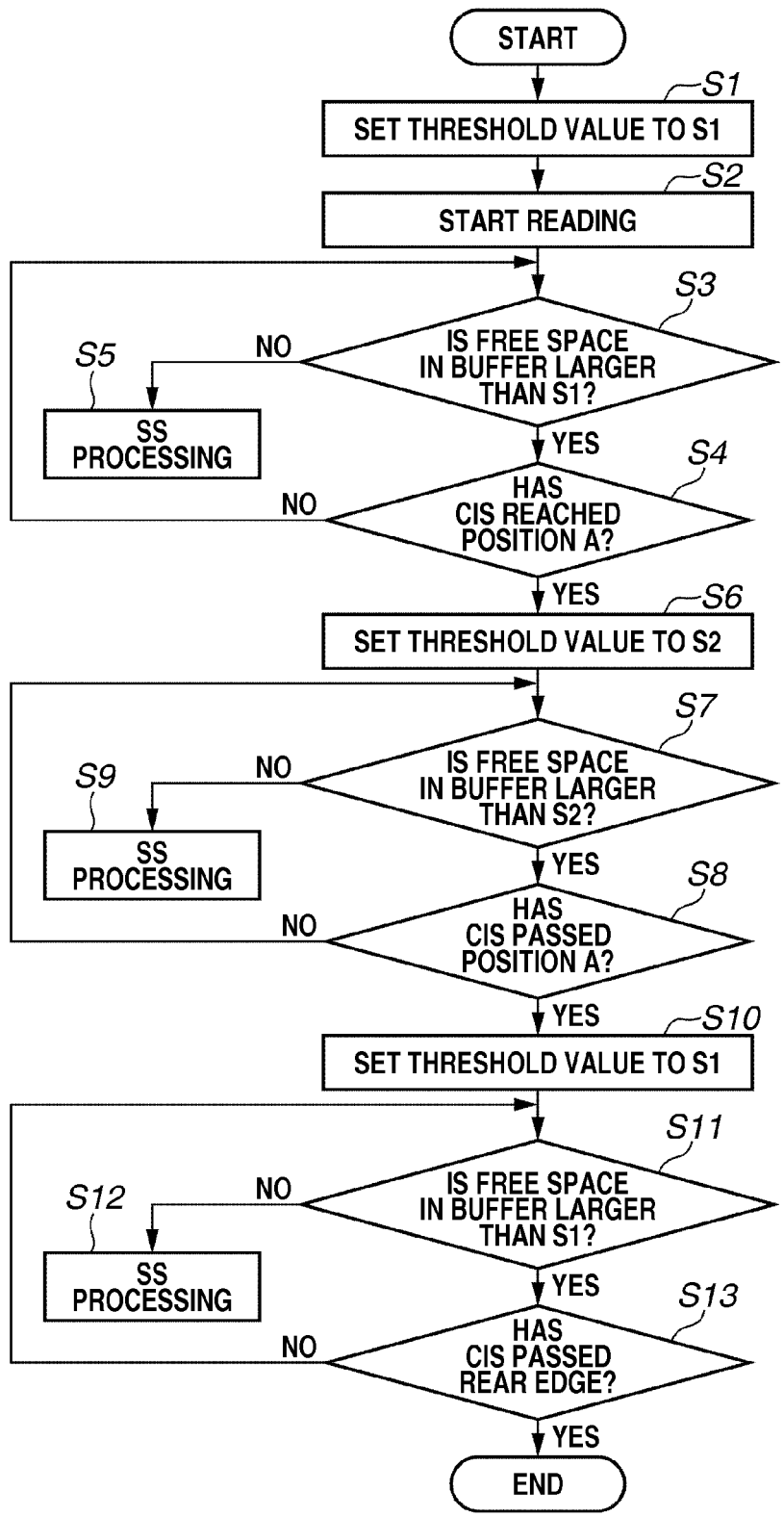
FIG. 8 is a flowchart illustrating a control operation of the image reading apparatus according to the first exemplary embodiment.

FIG. 8 is a flowchart illustrating a control operation described above. The control operation is a reading operation for one sheet of document, which is performed by the CPU 114 described above. Here, for example, the document is read from the leading edge thereof (the position O in FIG. 6) to the trailing edge thereof (the position D in FIG. 6).

In step S1, the CPU 114 sets the threshold to S1. In step S2, the image reading apparatus 101 starts reading. In step S3, the CPU 114 determines whether the free space in the buffer RAM 109 is larger than the threshold value S1.

If the free space is larger than the threshold value S1 (YES in step S3), the processing proceeds to step S4. If the free space is not larger than the threshold value S1 (NO in step S3), the processing proceeds to step S5. In step S5, the CPU 114 performs SS processing.

In step S4, the CPU 114 determines whether the CIS 407 has reached the position A. If the CIS 407 has reached the position A (YES in step S4), the processing proceeds to step S6. If the CIS 407 has not reached the position A (NO in step S4), the processing returns to step S3. In step S6, the CPU 114 sets the threshold value to S2. That is, the CPU 114 changes the threshold value from S1 to S2. At the position A of the document, the CPU 114 performs processing for determining the free space in the buffer RAM 109 based on the threshold value S2.

In step S7, the CPU 114 determines whether the free space in the buffer RAM 109 is larger than the threshold value S2. If the free space is larger than the threshold value S2 (YES in step S7), the processing proceeds to step S8. If the free space is not larger than the threshold value S2 (NO in step S7), the processing proceeds to step S9. In step S9, the CPU 114 performs SS processing.

In step S8, the CPU 114 determines whether the CIS 407 has passed the position A. If the CIS 407 has passed the position A (YES in step S8), the processing proceeds to step S10. If the CIS 407 has not yet passed the position A (NO in step S8), the processing returns to step S7.

In step S10, the CPU 114 sets the threshold value to S1. That is, the CPU 114 changes the threshold value from S2 to S1. In step S11, the CPU 114 determines whether the free space in the buffer RAM 109 is larger than the threshold value S1. If the free space is larger than the threshold value S1 (YES in step S11), the processing proceeds to step S13. If the free space is not larger than the threshold value S1, (NO in step S11), the processing proceeds to step S12. In step S12, the CPU 114 performs SS processing.

In step S13, the CPU 114 determines whether the CIS 407 has passed the trailing edge of the document. If the CIS 407 has passed the trailing edge of the document (YES in step S13), the CPU 114 ends reading by the CIS 407. If the CIS 407 has not yet passed the trailing edge of the document (NO in step S13), the processing returns to step S11.

A case where the CPU 114 performs SS processing is described now. In step S5, after performing SS processing (stopping reading), the CPU 114 determines whether the buffer RAM 109 has become empty. If the data stored in the buffer RAM 109 is orderly transferred to the host computer 100, the free space increases.

The CPU 114 keeps stopping reading until the buffer RAM 109 becomes empty (until all of the data stored in the buffer RAM 109 is transferred).

When the buffer RAM 109 has become empty, the CPU 114 resumes reading. Likewise, after having performed SS processing in steps S9 and S12, the CPU 114 keeps stopping reading until the buffer RAM 109 has become empty.

As described above, the CPU 114 differentiates processing for stopping reading between a regions where the document is unstably conveyed and other regions depending on the position where the CIS 407 reads the document. A condition for stopping reading is changed to differentiate processing for stopping reading so that the quality of a read image can be prevented from being deteriorated.

More specifically, different threshold values are used depending on the free space of a buffer RAM, which temporarily stores read data, between a region where the document is unstably conveyed and other regions. A CPU, which controls an image reading apparatus, uses the different threshold values depending on a reading position to change processing for stopping reading.

Second Exemplary Embodiment

Figure 7:
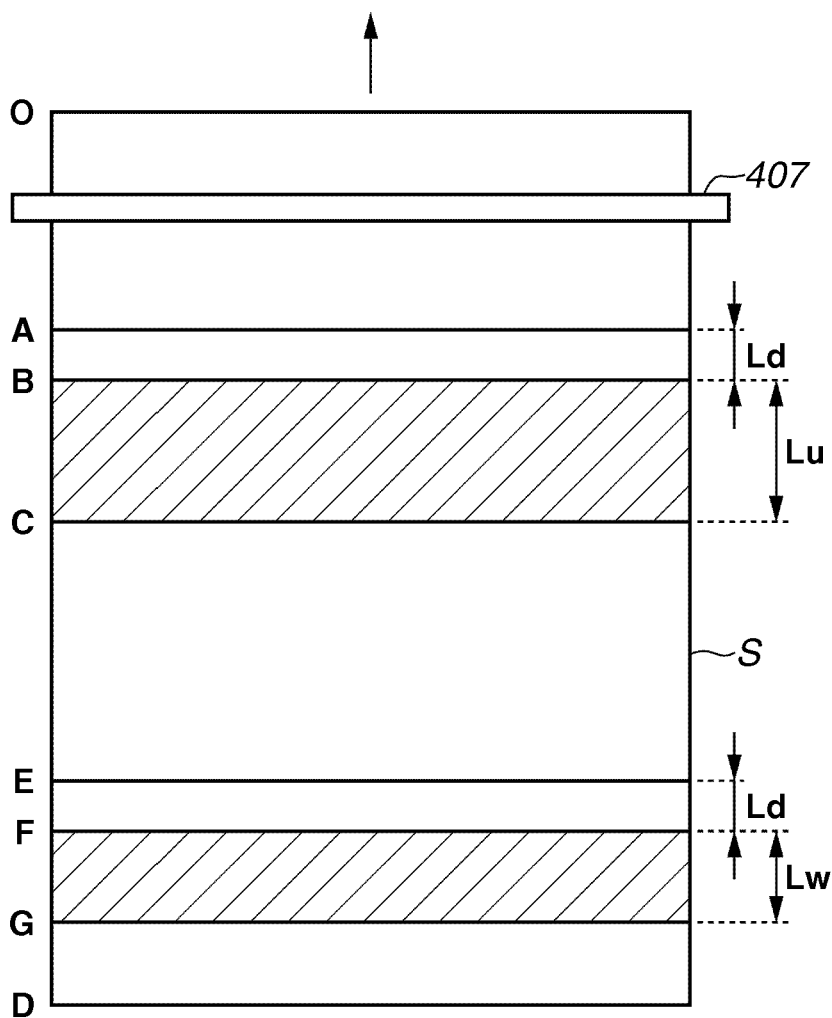
FIG. 7 illustrates a positional relationship between a reading region of a document and the position of a contact image sensor according to a second exemplary embodiment of the present invention.

FIG. 7 illustrates a positional relationship between a reading region of the document S and the position of the CIS 407, in which there are two SS-forbidden regions (document unstable regions). Descriptions different from the first exemplary embodiment will be described, and descriptions similar to the first exemplary embodiment will be omitted.

The description of reading by the CIS 407 between the positions O and C is similar to the first exemplary embodiment, and will be omitted. When the leading edge of the document S is located at the position of the discharge roller 403 illustrated in FIG. 4, the CIS 407 is located between positions F and G illustrated in FIG. 7.

4. Determining SS Processing During Reading Processing Between Positions C and E (Except for the Positions C and E)

When the CIS 407 is reading the document between the positions C and E, the CPU 114 determines whether the free space in the buffer RAM 109 is smaller than the threshold value S1 (threshold value S1=Bl×Ld). If the free space in the buffer RAM 109 is not larger than the threshold value S1, the CPU 114 performs SS processing.

5. Determining SS Processing During Reading Processing at the Position E

When the CIS 407 is reading a line corresponding to the position E, the CPU 114 determines whether the free space in the buffer RAM 109 is larger than a threshold value S3 (threshold value S3=Bl×(Ld+Lw)). Lw is the number of lines required for reading between the positions F and G (SS-forbidden region=document unstable region), which is determined by a mechanical configuration. The value Lw is different from the value Lu. Ld is the number of lines required from starting to decrease the reading speed to stoppage of the document.

If the free space in the buffer RAM 109 is not larger than the threshold value S3, the CPU 114 performs SS processing.

6. Determining SS Processing During Reading Processing Between the Positions E and D (Except for the Position E)

When the CIS 407 is reading the document (except for the position E), the CPU 114 determines whether the free space in the buffer RAM 109 is larger than the threshold value S1 (threshold value S1=Bl×Ld).

If the free space in the buffer RAM 109 is not larger than the threshold value S1, the CPU 114 performs SS processing.

Other Exemplary Embodiment

Exemplary embodiments of the present invention can also be applied, for example, to a reading operation in which a region required to decrease the reading speed to stop the document is set to zero. Referring to FIG. 6, in this case, Ld is regarded as 0. The CPU 114 does not need to determine at the position A whether to perform SS processing, but can determine the same when the CIS 407 is located at the position B by comparing the free space in the buffer RAM 109 and a threshold value S4 (S4=Bl×Lu).

Regarding the position of the document that the CIS 407 reads, SS processing can be determined based on the threshold value S2 at a plurality of lines including a line corresponding to the position A described in the first exemplary embodiment. For example, the threshold value S2 at the position A in the first exemplary embodiment can be defined as follows:

$$S2=Bl\times(2\times Ld+Lu).$$

Ld is the number of lines required from starting to decrease the reading speed to stoppage of the document.

In the above expression, in order to allow the free space in the buffer RAM 109 to have an extra space, the threshold value S2 is defined using 2×Ld.

Likewise, SS processing can be determined depending on the threshold value S3 at a plurality of the lines including each line at the positions A and E in the second exemplary embodiment.

Further, when resuming reading processing after performing SS processing, the CPU 114 can control the reading processing using a reading-resuming threshold value T. For example, when performing SS processing between positions A and of the document, the CPU 114 determines whether the free space in the buffer RAM 109 is larger than the reading-resuming threshold value T1=Ld, which is a condition for resuming reading. If the free space is larger than the threshold value T1=Ld, the CPU 114 performs reading processing.

When performing SS processing between positions A and B of the document, the CPU 114 determines whether the free space in the buffer RAM 109 is larger than the reading-resuming threshold value T2=Ld+Lu, which is a condition for resuming reading.

If the free space is larger than the reading-resuming threshold value T2=Ld+Lu, the CPU 114 performs reading processing. While performing SS processing between positions B and C of the document, the CPU 114 determines whether the free space in the buffer RAM 109 is larger than the reading-resuming threshold value T3=Lu, which is a condition for resuming reading.

If the free space is larger than the threshold value T3=Lu, the CPU 114 performs reading processing.

In any cases, as described above, the CIS 407 can resume reading based on the reading-resuming threshold value T, depending on the position of the document (in the conveyance direction). Thus, different threshold values (conditions) are set for starting the reading processing after SS processing is performed based on the position of the document where the CIS 407 stops.

Further, a control configuration of the image reading apparatus 101 can be formed with one chip of application specific integrated circuit (ASIC) including the CPU 114 and the shading correction circuit 107.

In the above-described exemplary embodiments, data stored in the buffer RAM 109 is transferred to the host computer 100. However, the transfer destination is not limited to a host computer. For example, if an image forming apparatus includes a memory card unit capable of detachably mounting a memory card (e.g., a CompactFlash (CF) card or a secure digital (SD) card), the data stored in the buffer RAM 109 can be transferred to the memory card unit.

That is, the memory card mounted in the memory card unit can store the data read from the buffer RAM 109.

Further, the image reading apparatus 101 can include a control program with which a CPU controls the threshold value described in the exemplary embodiments of the present invention. The ROM 115 can store that program with the threshold values.

Furthermore, the image reading apparatus 101 uses a stepping motor as a driving source of a conveyance system, but can use a DC motor. In this case, for example, a roller that conveys the document can be provided with a rotary encoder. The position of the document can be determined based on a signal from the rotary encoder.

As described above, by changing a condition for performing SS processing, the CPU 114 does not perform SS processing when the document is unstably conveyed, so that the deterioration of image quality can be reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-208737 filed Aug. 10, 2007, which is hereby incorporated by reference herein in its entirety.

What is claimed is:

1. An image reading apparatus comprising:
   a conveying unit configured to convey a document;
   a reading unit configured to read an image of the document conveyed by the conveying unit;
   a storage unit configured to store data of the image read by the reading unit; and
   a reading control unit configured to cause the reading unit to stop the reading operation and cause the conveying unit to stop the conveying operation of the conveyed document at a position other than a stop-forbidden position where a stop of the conveyed document is forbidden in a case where a free space available for storing the data in the storage unit is lacking, and cause the reading unit to restart the reading operation and cause the conveying unit to restart the conveying operation of the stopped document in a case where the free space available for storing the data in the storage unit increases,
   wherein the reading control unit causes the reading unit to stop the reading operation and causes the conveying unit to stop the conveying operation, in accordance with both of the free space available for storing the data in the storage unit and a current position of the conveyed document, so as to stop the conveyed document before the stop-forbidden position.

2. The image reading apparatus according to claim 1, wherein the reading control unit controls the reading operation of the reading unit and the conveying operation of the conveying unit in accordance with a threshold value set according to respective current positions of the document conveyed by the conveying unit, and
   wherein the reading control unit controls the reading operation of the reading unit and the conveying operation of the conveying unit using different threshold values based on the respective current positions of the document conveyed by the conveying unit.

3. The image reading apparatus according to claim 1, wherein the reading control unit determines the free space each time the reading unit reads one line of an image.

4. The image reading apparatus according to claim 1, wherein the reading control unit controls the reading unit to stop the reading operation and the conveying unit to stop the conveying operation based on an amount of data stored in the storage unit.

5. The image reading apparatus according to claim 1 further comprising a memory unit configured to store the threshold value,
   wherein the reading control unit changes controlling of the reading unit to perform or stop the reading operation and the conveying unit to perform or stop the conveying operation according to the threshold value stored in the memory unit.

6. The image reading apparatus according to claim 5, wherein the memory unit stores a reading-resuming threshold value for determining whether to resume the reading operation when the reading operation is stopped, the reading-resuming threshold value corresponding to a position of the document, and
   wherein the reading control unit controls the reading unit to resume the reading operation based on the reading-resuming threshold value.

7. A method for controlling a reading operation of an image reading apparatus including a conveying unit configured to convey a document, a reading unit configured to read an image of the document conveyed by the conveying unit, and a storage unit configured to store data of the image read by the reading unit, the method comprising:
   causing the conveying unit to convey the document and causing the reading unit to read the image of the conveyed document;
   causing the storage unit to store the data of the image read by the reading unit of the conveyed document;
   causing the reading unit to stop the reading operation and the conveying unit to stop the conveying operation at a position other than a stop-forbidden position where a stop of the conveyed document is forbidden, in a case where a free space available for storing the data in the storage unit is lacking, in accordance with both of the free space and a current position of the conveyed document, so as to stop the conveyed document before the stop-forbidden position; and
   causing the reading unit to restart the reading operation and the conveying unit to restart the conveying operation of the stopped document in a case where the free space increases.

8. A non-transitory storage medium storing a control program for causing a computer to perform the method according to claim 7.

* * * * *